(12) United States Patent
Henry et al.

(10) Patent No.: US 9,410,505 B2
(45) Date of Patent: Aug. 9, 2016

(54) METHOD FOR LOCAL BOILING PROTECTION OF A HEAT EXCHANGER

(71) Applicant: General Electric Company, Schenectady, NY (US)

(72) Inventors: Luke Henry, Lawrence Park, PA (US); Roshan Shekhar Kotian, Lawrence Park, PA (US)

(73) Assignee: General Electric Company, Schenectady, NY (US)

(*) Notice: Subject to any disclaimer, the term of this patent is extended or adjusted under 35 U.S.C. 154(b) by 580 days.

(21) Appl. No.: 13/852,284

(22) Filed: Mar. 28, 2013

(65) Prior Publication Data

US 2014/0290631 A1    Oct. 2, 2014

(51) Int. Cl.
   F01P 7/14    (2006.01)
   F02M 25/07   (2006.01)

(52) U.S. Cl.
   CPC ........... *F02M 25/0738* (2013.01); *Y02T 10/121* (2013.01)

(58) Field of Classification Search
   CPC .......... F02M 25/0738; F02M 25/0731; F02M 25/0702; F02M 25/0746; F02M 25/7054; F02M 25/0762; F01P 5/10; F01P 7/04; F01P 7/14; F01P 7/164; F01P 7/167; F01P 2007/168
   USPC ................. 123/568.12, 568.16, 41.01, 41.13, 123/41.57
   See application file for complete search history.

(56) References Cited

U.S. PATENT DOCUMENTS

| | | | |
|---|---|---|---|
| 6,128,948 A * | 10/2000 | Shi et al. ............... | 73/114.68 |
| 6,684,940 B1 * | 2/2004 | Chao ..................... | C09K 5/10 165/104.21 |
| 6,729,133 B1 * | 5/2004 | Sorter et al. .................. | 60/599 |
| 7,131,288 B2 * | 11/2006 | Toonen et al. ............. | 62/324.1 |
| 7,461,640 B1 * | 12/2008 | Agee et al. ............. | 123/568.12 |
| 7,528,088 B2 | 5/2009 | Umeda et al. | |
| 7,673,591 B2 * | 3/2010 | Vuk ......................... | 123/41.02 |
| 8,342,141 B2 * | 1/2013 | Dahl et al. .................. | 123/41.1 |
| 9,109,518 B2 * | 8/2015 | Balestrino .............. | F02D 21/08 |
| 2003/0089319 A1 * | 5/2003 | Duvinage et al. .......... | 123/41.02 |
| 2005/0113988 A1 * | 5/2005 | Nasr et al. ..................... | 701/22 |
| 2006/0112701 A1 * | 6/2006 | Dykstra ....................... | 62/132 |
| 2010/0043525 A1 * | 2/2010 | Recouvreur ........... | F01N 11/002 73/23.31 |
| 2010/0107995 A1 * | 5/2010 | Kamiyama et al. ........ | 123/41.02 |
| 2011/0005474 A1 * | 1/2011 | Carlson et al. .............. | 123/41.1 |
| 2011/0048389 A1 * | 3/2011 | Hsia et al. ............... | 123/568.12 |
| 2011/0099989 A1 * | 5/2011 | Prior et al. ..................... | 60/320 |
| 2011/0139133 A1 * | 6/2011 | Surnilla et al. ........... | 123/568.12 |
| 2011/0146244 A1 * | 6/2011 | Farman et al. ................. | 60/285 |
| 2012/0059543 A1 * | 3/2012 | Nakazono et al. ............. | 701/22 |
| 2012/0179320 A1 * | 7/2012 | Abe et al. ...................... | 701/22 |
| 2012/0323465 A1 * | 12/2012 | Peters et al. ................. | 701/104 |

(Continued)

FOREIGN PATENT DOCUMENTS

WO    WO 2013158082 A1 *  10/2013

*Primary Examiner* — Hung Q Nguyen
*Assistant Examiner* — George Jin
(74) *Attorney, Agent, or Firm* — GE Global Patent Operation (57) ABSTRACT

Various methods and systems are provided for estimating a wall temperature in a heat exchanger and reducing the risk of boiling on a coolant side of the heat exchanger. In one embodiment, a method for an engine comprises estimating a wall temperature at a location in a heat exchanger and adjusting an engine operating parameter of an engine coupled to the heat exchanger based on the wall temperature.

18 Claims, 5 Drawing Sheets

(56) References Cited

U.S. PATENT DOCUMENTS

| | | | |
|---|---|---|---|
| 2012/0323470 A1* | 12/2012 | Klingbeil et al. | 701/108 |
| 2013/0186121 A1* | 7/2013 | Erb et al. | 62/238.1 |
| 2014/0034287 A1* | 2/2014 | Buford et al. | 165/287 |
| 2014/0060503 A1* | 3/2014 | Zhu et al. | 123/568.12 |
| 2014/0196701 A1* | 7/2014 | Stojkovic et al. | 123/568.12 |
| 2014/0283764 A1* | 9/2014 | Abou-Nasr et al. | 123/41.02 |
| 2015/0075505 A1* | 3/2015 | Ryan et al. | 123/568.12 |
| 2015/0198105 A1* | 7/2015 | Marlett et al. | |

\* cited by examiner

METHOD FOR LOCAL BOILING PROTECTION OF A HEAT EXCHANGER

FIELD

Embodiments of the subject matter disclosed herein relate to a heat exchanger, such as an exhaust gas recirculation cooler in an exhaust gas recirculation system coupled to an internal combustion engine, for example.

BACKGROUND

Heat exchangers are used to exchange heat between two fluids. In one example, heat may be transferred from a first fluid to a second fluid, such as from air to a coolant in a liquid-cooled heat exchanger. As a result, the temperature of the coolant may increase. If the coolant temperature increases to a high enough level, boiling of the coolant may occur within the heat exchanger and possibly result in heat exchanger degradation. Engines may utilize heat exchangers such as an exhaust gas recirculation (EGR) cooler, used to reduce the temperature of recirculated exhaust gas before it enters an intake passage of the engine. In one example, the temperature of an engine coolant circulating through the EGR cooler may increase above a threshold level, increasing the likelihood of boiling within the cooler. As such, EGR cooler degradation may increase.

BRIEF DESCRIPTION

In one embodiment, an engine method (e.g., method for controlling an engine) comprises estimating a wall temperature at a location in a heat exchanger and adjusting an engine operating parameter of an engine coupled to the heat exchanger based on the wall temperature.

In this way, conditions for boiling in the heat exchanger, at the location where the wall temperature is estimated, may be predicted based on the wall temperature. Adjusting the engine operating parameter based on the wall temperature may then reduce the wall temperature; thereby reduce the risk of boiling.

In another embodiment, a method for an engine includes adjusting an engine operating parameter responsive to a wall temperature in a heat exchanger being greater than an upper threshold temperature and not adjusting the engine operating parameter when the wall temperature is less than the upper threshold temperature.

The upper threshold temperature may be defined as the temperature at which local boiling (e.g., boiling at the location in which the wall temperature of the heat exchanger is estimated) may occur in the heat exchanger. As such, adjusting the engine operating parameter when the wall temperature is greater than the upper threshold temperature may reduce the wall temperature below the upper threshold temperature. In this way, the wall temperature in the heat exchanger may be controlled, thereby reducing boiling in the heat exchanger and degradation of the heat exchanger.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

The following description relates to various embodiments of methods and systems for estimating a wall temperature in a heat exchanger and reducing the risk of boiling on a coolant side of the heat exchanger. As the coolant temperature in the heat exchanger increases due to exchanging heat with a second fluid in the heat exchanger, boiling may occur, thereby degrading the heat exchanger. Local boiling may be predicted by estimating the temperature at a location in the heat exchanger, such as the wall of the heat exchanger. For example, in response to a wall temperature at a location in a heat exchanger increasing above an upper threshold temperature, an engine operating parameter may be adjusted. The upper threshold temperature may be defined as the temperature at which local boiling (e.g., boiling at the location in which the wall temperature of the heat exchanger is estimated) may occur in the heat exchanger. Engine operating parameters may include engine speed and engine power. For example, when the wall temperature in the heat exchanger is greater than the upper threshold temperature, engine speed may be increased. In another example, if the wall temperature remains greater than the upper threshold temperature after increasing engine speed, engine power may be de-rated. These adjustments may increase the upper threshold temperature and/or decrease the wall temperature in the heat exchanger. As such, the adjustments based on the wall temperature estimation may reduce the risk of coolant boiling and heat exchanger degradation. The estimated wall temperature may be used for various additional or alternative degradation reduction, including one or more of reducing over-temperature of thermal material limits, and reducing thermal gradient across multiple components.

In one example, the above system and method may be used to estimate a wall temperature in an exhaust gas recirculation (EGR) cooler in an engine. In this system, a fluid, or coolant, may be used to cool hot exhaust recirculating via an EGR passage to the engine intake manifold. By estimating the wall temperature in the EGR cooler, such as a wall temperature near an outlet side of a coolant passage in the EGR cooler, local boiling may be predicted and reduced by adjusting an engine operating parameter. Though this method and system is described below with regard to an EGR system of an engine and an EGR cooler, the approach described herein may be used in a variety of heat exchangers in a variety of applications. For example, the method described herein to estimate a wall temperature may be used to estimate a temperature at other suitable locations and/or in other suitable heat exchangers, such as charge air coolers.

Additionally, the approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include mining equipment, marine vessels, on-road transportation vehicles, off-highway vehicles (OHV), and rail vehicles. For clarity of illustration, a locomotive is provided as an example of a mobile platform supporting a system incorporating an embodiment of the invention.

Figure 1:
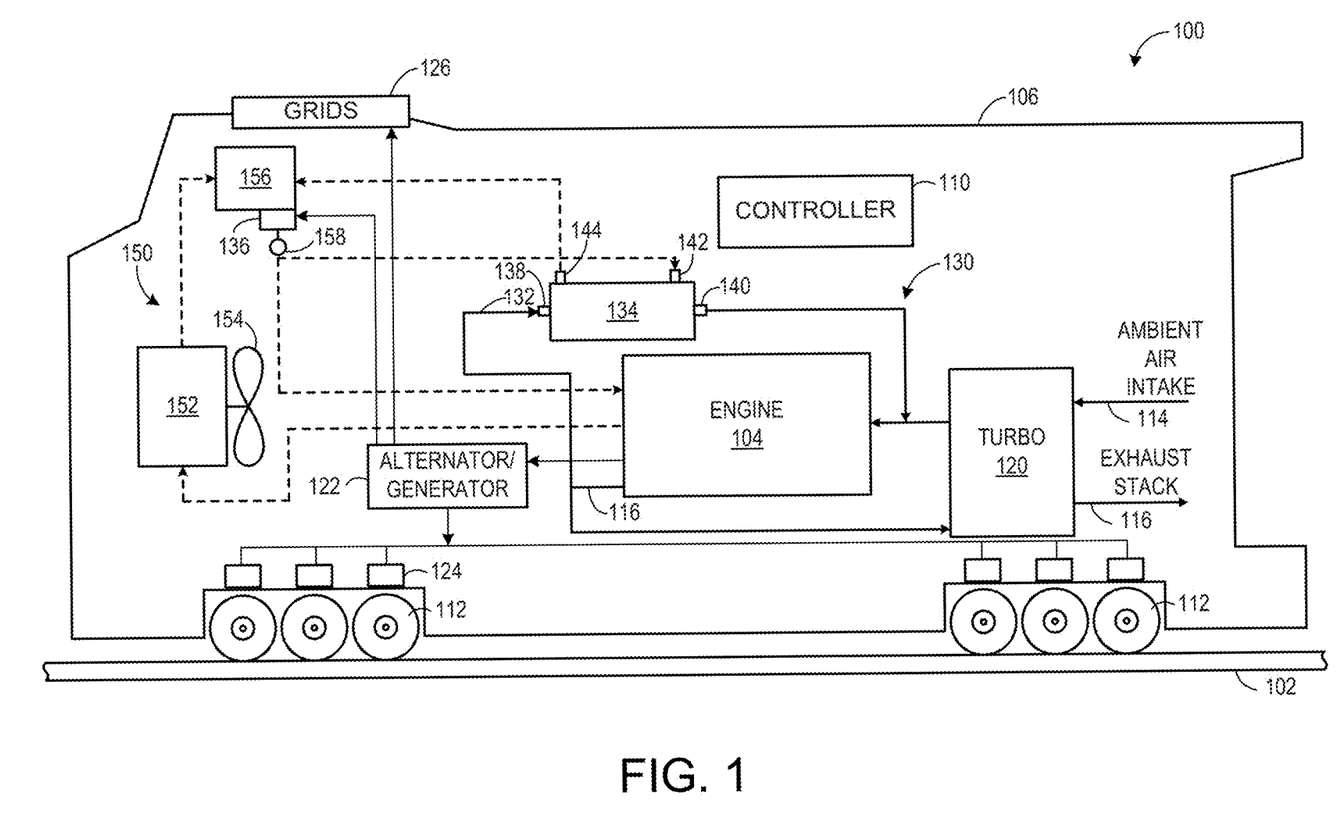
FIG. 1 is a schematic diagram of an embodiment of a rail vehicle with an engine.

Before further discussion of the approach for estimating a wall temperature in a heat exchanger, an example of a platform is disclosed in which the EGR system may be configured for an engine in a vehicle, such as a rail vehicle. For example, FIG. 1 shows a block diagram of an example embodiment of a vehicle system 100, herein depicted as a rail vehicle 106 (e.g., a locomotive), configured to run on a rail 102 via a plurality of wheels 112. As depicted, the rail vehicle 106 includes an engine 104. In other non-limiting embodiments, the engine 104 may be a stationary engine, such as in a power-plant application, or an engine in a marine vessel or off-highway vehicle propulsion system as noted above.

The engine 104 receives intake air for combustion from an intake passage 114. The intake passage 114 receives ambient air from an air filter (not shown) that filters air from outside of the rail vehicle 106. Exhaust gas resulting from combustion in the engine 104 is supplied to an exhaust passage 116. Exhaust gas flows through the exhaust passage 116, and out of an exhaust stack of the rail vehicle 106. In one example, the engine 104 is a diesel engine that combusts air and diesel fuel through compression ignition. In other non-limiting embodiments, the engine 104 may combust fuel including gasoline, kerosene, biodiesel, or other petroleum distillates of similar density through compression ignition (and/or spark ignition).

In one embodiment, the rail vehicle 106 is a diesel-electric vehicle. As depicted in FIG. 1, the engine 104 is coupled to an electric power generation system, which includes an alternator/generator 122 and electric traction motors 124. For example, the engine 104 is a diesel engine that generates a torque output that is transmitted to the generator 122 which is mechanically coupled to the engine 104. The generator 122 produces electrical power that may be stored and applied for subsequent propagation to a variety of downstream electrical components. As an example, the generator 122 may be electrically coupled to a plurality of traction motors 124 and the generator 122 may provide electrical power to the plurality of traction motors 124. As depicted, the plurality of traction motors 124 are each connected to one of a plurality of wheels 112 to provide tractive power to propel the rail vehicle 106. One example configuration includes one traction motor per wheel. As depicted herein, six pairs of traction motors correspond to each of six pairs of motive wheels of the rail vehicle. In another example, alternator/generator 122 may be coupled to one or more resistive grids 126. The resistive grids 126 may be configured to dissipate excess engine torque via heat produced by the grids from electricity generated by alternator/generator 122.

The vehicle system 100 includes a turbocharger 120 that is arranged between the intake passage 114 and the exhaust passage 116. The turbocharger 120 increases air charge of ambient air drawn into the intake passage 114 in order to provide greater charge density during combustion to increase power output and/or engine-operating efficiency. The turbocharger 120 may include a compressor (not shown) which is at least partially driven by a turbine (not shown). While in this case a single turbocharger is included, the system may include multiple turbine and/or compressor stages.

In some embodiments, the vehicle system 100 may further include an aftertreatment system coupled in the exhaust passage upstream and/or downstream of the turbocharger 120. In one example embodiment, the aftertreatment system may include a diesel oxidation catalyst (DOC) and a diesel particulate filter (DPF). In other embodiments, the aftertreatment system may additionally or alternatively include one or more emission control devices. Such emission control devices may include a selective catalytic reduction (SCR) catalyst, three-way catalyst, $NO_x$ trap, or various other devices or systems.

The vehicle system 100 further includes an exhaust gas recirculation (EGR) system 130 coupled to the engine 104, which routes exhaust gas from an exhaust passage 116 of the engine 104 to the intake passage 114 downstream of the turbocharger 120. In some embodiments, the exhaust gas recirculation system 130 may be coupled exclusively to a group of one or more donor cylinders of the engine. As depicted in FIG. 1, the EGR system 130 includes an EGR passage 132 and an EGR cooler 134 to reduce the temperature of the exhaust gas before it enters the intake passage 114. By introducing exhaust gas to the engine 104, the amount of available oxygen for combustion is decreased, thereby reducing the combustion flame temperatures and reducing the formation of nitrogen oxides (e.g., $NO_x$).

In some embodiments, the EGR system 130 may further include an EGR valve for controlling an amount of exhaust gas that is recirculated from the exhaust passage 116 of the engine 104 to the intake passage 114 of engine 104. The EGR valve may be an on/off valve controlled by the controller 110, or it may control a variable amount of EGR, for example. As shown in the non-limiting example embodiment of FIG. 1, the EGR system 130 is a high-pressure EGR system. In other embodiments, the vehicle system 100 may additionally or alternatively include a low-pressure EGR system, routing EGR from downstream of the turbine to upstream of the compressor.

As depicted in FIG. 1, the vehicle system 100 further includes a cooling system 150. The cooling system 150 circulates coolant through the engine 104 to absorb waste engine heat and distribute the heated coolant to a heat exchanger, such as a radiator 152. A fan 154 may be coupled to the radiator 152 in order to maintain an airflow through the radiator 152 when the vehicle 106 is moving slowly or stopped while the engine is running. In some examples, fan speed may be controlled by a controller. In an alternate example, the radiator 152 may be positioned near the top of the rail vehicle 106, relative the rail 102.

Coolant which is cooled by the radiator 152 enters a tank 156. The coolant may then be pumped by a water, or coolant, pump 136 back to the engine 104 or to another component of the vehicle system. As shown in FIG. 1, coolant may be pumped from the tank 156 to the EGR cooler 134 such that a temperature of exhaust gas flowing through the EGR cooler 134 may be reduced before it enters the intake passage 114. A temperature of the coolant may be measured by a coolant temperature sensor 158 before it enters the engine 104 or the EGR cooler 134. Coolant that passes through the EGR cooler 134 then flows back to the tank 156. In other embodiments, the EGR cooler and the radiator may have separate tanks.

Figure 5:
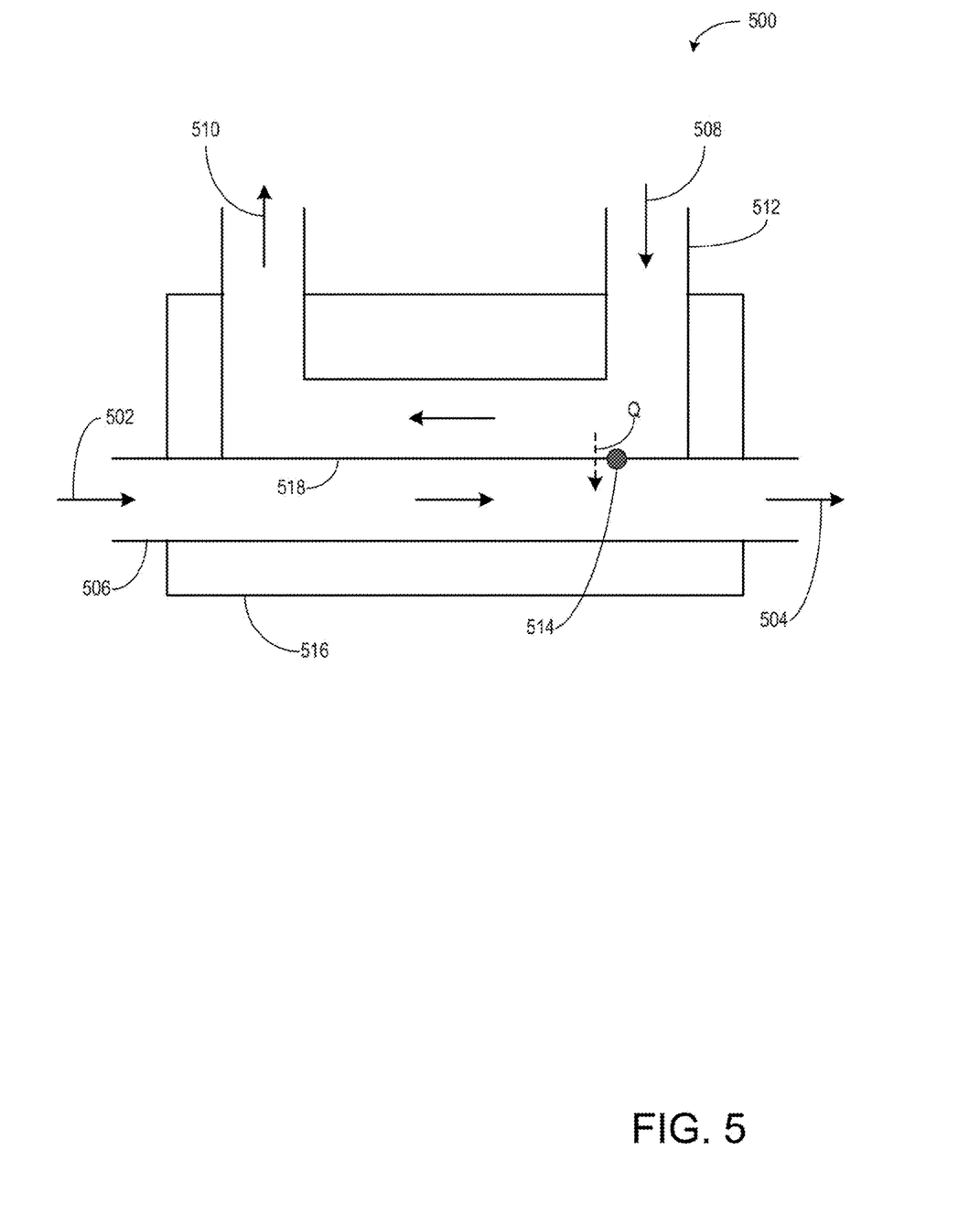
FIG. 5 is a schematic diagram of a heat exchanger including a location for estimating a wall temperature according to an embodiment of the invention.

In one embodiment, the EGR cooler 134 is a counter flow heat exchanger. In a counter flow heat exchanger, a first heat transfer fluid and a second heat transfer fluid enter the heat exchanger at opposite ends. The counter flow design is the most efficient, in that it can transfer the most heat since the average temperature difference between the two heat transfer fluids at any point within the heat exchanger is greater than in other configurations. An example of a counter flow heat exchanger 516 is depicted in FIG. 5, discussed further below. In another embodiment, the EGR cooler 134 is a parallel flow heat exchanger. In a parallel flow heat exchanger, the first heat transfer fluid and the second heat transfer fluid enter the heat exchanger at the same end and travel parallel to one another to the exit of the heat exchanger. The methods described herein may be used for counter flow, parallel flow, or additional types of heat exchangers.

Exhaust gas may be cooled as it travels through the EGR cooler 134. Warm exhaust gas enters the EGR cooler 134 at an EGR gas inlet 138. An inlet gas temperature may be measured by a temperature sensor (e.g., thermocouple) and used as the bulk gas temperature, $T_{gas}$, of the gas (e.g., exhaust gas) traveling through the gas side, or gas passage, of the EGR cooler 134. Coolant, such as engine coolant from the cooling system 150, enters the EGR cooler 134 at the EGR coolant inlet 142. An inlet coolant temperature is determined from a sensor, such as the coolant temperature sensor 158, described above. As gas and coolant travel through the EGR cooler, heat may exchange between the gas side (e.g., gas passage) and coolant side (e.g., coolant passage) of the heat exchanger, across the material (e.g., metal) separating the gas side and the coolant side (e.g., material partition). For example, heat may transfer from the warm exhaust gas, across the material partition, to the coolant. The cooled exhaust gas then exits the EGR cooler 134 at the EGR gas outlet 140 and travels to the intake passage 114. The coolant exits the EGR cooler 134 at the EGR coolant outlet 144 and returns to the tank 156. An outlet coolant temperature may be measured by a temperature sensor and used as the bulk coolant temperature, $T_{coolant}$, of the coolant flowing through the coolant side of the EGR cooler.

The rail vehicle 106 further includes an engine controller 110 to control various components related to the rail vehicle 106. As an example, various components of the vehicle system may be coupled to the engine controller 110 via a communication channel or data bus. In one example, the engine controller 110 includes a computer control system. The engine controller 110 may additionally or alternatively include a memory holding non-transitory computer readable storage media (not shown) including code for enabling on-board monitoring and control of rail vehicle operation.

The engine controller 110 may receive information from a plurality of sensors and may send control signals to a plurality of actuators. The engine controller 110, while overseeing control and management of the rail vehicle 106, may be configured to receive signals from a variety of engine sensors, as further elaborated herein, in order to determine operating parameters and operating conditions, and correspondingly adjust various engine actuators to control operation of the rail vehicle 106. For example, the engine controller 110 may receive signals from various engine sensors including, but not limited to, engine speed, engine load, intake manifold air pressure, boost pressure, exhaust pressure, ambient pressure, ambient temperature, exhaust temperature, particulate filter temperature, particulate filter back pressure, engine coolant pressure, gas temperature in the EGR cooler (e.g., $T_{gas}$), or the like. Correspondingly, the engine controller 110 may control the rail vehicle 106 by sending commands to various components such as the traction motors 124, the alternator/generator 122, cylinder valves, fuel injectors, a notch throttle, or the like. Other actuators may be coupled to various locations in the rail vehicle.

In one example, the engine controller 110 may be configured identify a temperature of coolant entering the EGR cooler, a temperature of coolant exiting the EGR cooler ($T_{coolant}$), a temperature of exhaust gas entering the EGR cooler ($T_{gas}$), and a temperature of exhaust gas exiting the EGR cooler. In one example, $T_{gas}$ and $T_{coolant}$ may be used as the bulk gas temperature at the inlet of the gas passage and the bulk coolant temperature at the outlet of the coolant passage, respectively, in the EGR cooler. The controller may then utilize these temperatures to calculate and/or estimate the heat transfer in the EGR cooler, for example, as described in further detail with regard to FIG. 3.

Heat exchangers, such as EGR coolers, and particularly counter flow heat exchangers, may experience boiling on the coolant side of the heat exchanger. As heat exchange efficiency increases, as with counter flow heat exchangers, more heat is exchanged from a first heat transfer fluid (e.g., gas) to a second heat transfer fluid (e.g., coolant). As such, the temperature of the coolant may increase as it travels through the heat exchanger. In some cases, the temperature of the coolant may increase to its boiling point, resulting in boiling. For example, in an EGR cooler, boiling may occur near the outlet side of the coolant passage. Boiling in the heat exchanger may result in heat exchanger degradation, including rupture of the thin-walled tubes of the coolant passages.

FIG. 5 shows a schematic 500 of an example of a heat exchanger 516, such as an EGR cooler, illustrating the flow of a first heat transfer fluid and a second heat transfer fluid through the heat exchanger. The heat exchanger 516 is depicted in FIG. 5 as a counter flow heat exchanger. However, as described above, the heat exchanger may be another type of heat exchanger such as a parallel flow heat exchanger. The first heat transfer fluid may be a gas, such as exhaust gas in the case of an EGR cooler. The heat exchanger 516 has a gas passage 512 in which gas enters the heat exchanger 516 at gas entrance 508 and exits the heat exchanger 516 at gas exit 510. In the example of the EGR cooler, such as EGR cooler 134 shown in FIG. 1, exhaust gas may enter gas entrance 508 from the exhaust passage 116 in FIG. 1 and exit the EGR cooler 134 at gas exit 510. From gas exit 510, the exhaust gas travels back to the intake passage 114.

The second heat transfer fluid may be a coolant, such as engine coolant in the case of the EGR cooler. Coolant enters the heat exchanger 516 at coolant entrance 502, travels through coolant passage 506, and exits the heat exchanger 516 at coolant exit 504. In the case of EGR cooler 134 shown in FIG. 1, engine coolant flows from a tank 156 into the coolant entrance 502. Engine coolant then passes through coolant passage 506 and returns to the tank 156.

Heat, Q, is exchanged between the gas and the coolant in the heat exchanger 516. Warmer gas enters at gas entrance 508 and travels through gas passage 512 while cooler coolant enters at coolant entrance 502 and travels through coolant passage 506. Heat Q is transferred from the warmer gas, across a wall 518 separating gas passage 512 from coolant passage 506, to the cooler coolant. As such, as coolant travels though coolant passage 506, the coolant temperature may increase. The temperature of the coolant may be the warmest near coolant exit 504. Additionally, the temperature of the gas may be warmest on the opposite side of the wall 518 from the coolant passage 506, near the coolant exit 504. As a result, the location in the coolant passage 506 near the coolant exit 504 of the heat exchanger 516 may be at greatest risk for coolant boiling. Thus, estimating a temperature of a wall in the coolant passage 506, near the outlet side of the coolant passage may predict local boiling in the heat exchanger 516. This location for estimating a wall temperature is shown at 514 in FIG. 2. In another embodiment, if the heat exchanger is not a counterflow heat exchanger as shown in FIG. 5, the location for highest local boiling risk may change. For example, in a parallel heat exchanger, the location for estimating a wall temperature may not be near the coolant exit of the heat exchanger.

Methods for estimating a wall temperature in a heat exchanger, such as the heat exchanger 516, are described further below with respect to FIGS. 2-4. A method for estimating a temperature, particularly a wall temperature, in a heat exchanger may allow a controller to predict conditions for boiling in the heat exchanger and take measures to reduce the risk of boiling. Local boiling may occur near a wall of the heat exchanger before bulk boiling occurs. Bulk boiling may be measured by heat exchanger temperature sensors. Coolant temperature may be the hottest near the outlet side of the coolant passage (e.g., EGR coolant outlet). As such, the risk of coolant boiling may be greatest at this location in the heat exchanger. Thus, an estimation of local boiling at the wall, near the outlet side of the coolant passage, may allow for temperature-reducing measures to be taken before bulk boiling occurs.

Local boiling may be predicted by estimating a wall temperature at a location in the heat exchanger, such as the coolant side of the heat exchanger. In one embodiment, the heat exchanger may be an EGR cooler and the wall temperature may be a temperature of a wall continuous with and in fluid contact with an engine coolant. Estimating the wall temperature may include estimating the heat transfer at the location, based on a temperature difference between a first heat transfer fluid and a second heat transfer fluid, and further based on one or more thermal resistances across the heat exchanger. Thermal resistance is the opposition to flow of heat energy. Each material or fluid along a heat energy flow path in the heat exchanger has a thermal resistance proportional to a temperature drop across the material or fluid for a given amount of heat energy.

The estimating heat transfer may include determining a first convection coefficient based on temperature and flow rate of the first heat transfer fluid and a second convection coefficient based on a temperature and flow rate of the second heat transfer fluid. A convection coefficient is a measure of how effectively a fluid (e.g., coolant or gas) transports heat energy to or from its surface. The estimating heat transfer may further include determining thermal resistances across the heat exchanger based on the first convention coefficient, the second convection coefficient, heat exchanger material properties, and fouling coefficients.

In an alternate embodiment, the method for estimating a wall temperature in a heat exchanger may be used for purposes other than or in addition to predicting local boiling. In one example, wall temperature estimation may be used to protect against exceeding a thermal material limit of a specific heat exchanger component. For example, a wall material in the heat exchanger may have an upper temperature threshold at which the material begins to degrade. In another example, wall temperature estimation may be used to reduce or avoid a specific thermal gradient across two entities of the heat exchanger. In this way, the method presented at FIG. 3 (described below) may be used to control a temperature at location within a heat exchanger within pre-determined thermal thresholds.

Engine operating parameter adjustments may be made based on the wall temperature in the heat exchanger. For example, an engine operating parameter may be adjusted in response to the wall temperature in the heat exchanger being greater than an upper threshold temperature. The upper threshold temperature may be defined as the temperature at which local boiling (e.g., boiling at the location in which the wall temperature of the heat exchanger is estimated) may occur in the heat exchanger. As such, if the wall temperature in the heat exchanger increases above the upper threshold temperature, local boiling may occur, thereby degrading the heat exchanger. Further, the upper threshold temperature at the wall of the heat exchanger may change based on engine operating conditions. For example, the upper threshold temperature may be based on an engine coolant, or water, pressure. The engine coolant pressure may be a pressure downstream of the coolant pump and upstream of the heat exchanger (e.g., EGR cooler). As such, the upper threshold temperature may increase with increasing engine coolant pressure. In another example, engine coolant pressure may be the pressure at the location of concern (e.g., where wall temperature is estimated) and may be either sensed or modeled. Engine operating parameter adjustments may decrease the wall temperature, increase the upper threshold temperature, or both in order to reduce the risk of boiling. Further, engine operating parameter adjustments may either affect the power capability of the engine or emissions compliance. For example, de-rating power may decrease the power capability of the engine while not affecting emissions compliance. In another example, the EGR flow rate may be decreased in order to reduce the wall temperature. However, this approach may also negatively impact emissions compliance.

In one embodiment, emissions-neutral engine operating parameter adjustments may be made before adjustments that may reduce emissions compliance. In one example, engine speed may be increased responsive to wall temperature greater than the upper threshold temperature. Since the engine is coupled to the alternator which generates electric power to drive the traction motors, engine speed may be increased without affecting motor fraction power and vehicle speed. Instead, motor fraction power may be maintained while increasing engine speed. Increasing engine speed may increase engine coolant pressure, thus increasing the upper threshold temperature. Further, increasing engine speed increases the flow rate of coolant through the EGR cooler which in turn increases a convection coefficient of the coolant. As described below with reference to FIG. 3, increasing the convection coefficient of the coolant may decrease the wall temperature. Thus, increasing engine speed may both reduce the wall temperature and increase the upper threshold temperature, reducing the risk of boiling in the EGR cooler.

In another example, engine power may be de-rated if increasing engine speed is not enough to decrease the wall temperature below the upper threshold temperature. De-rating engine power (e.g., de-rating power) may reduce the engine's power capability; however, this adjustment may not affect emissions compliance. De-rating power may include de-rating the traction motor output. In one example, the electric motors may be commanded to operate at a lower power output, thus decreasing the load from the alternator on the engine. In this way, exhaust temperature may decrease, thereby decreasing the temperature of the EGR and decreasing the wall temperature in the EGR cooler. Further, de-rating engine power may result in a decrease in EGR flow, thereby reducing convection on the gas side of the heat exchanger. This may increase the gas side thermal resistance compared to the coolant side thermal resistance, thereby shifting the wall temperature closer to the bulk coolant temperature (rather than to the bulk gas temperature). Additionally, while the EGR flow decreases, the coolant flow stays the same because the engine speed is unchanged. This may cause the bulk coolant outlet temperature increase, with respect to the coolant inlet temperature, to be smaller because less total heat is being exchanged in the EGR cooler overall.

In one example, de-rating power occurs when the wall temperature is greater than the upper threshold temperature and engine speed is at a maximum threshold speed. The maximum threshold speed may be the engine speed at which engine speed cannot be further increased. For example, the maximum threshold speed may be based on a desired engine torque, a notch throttle setting, a desired air-fuel ratio, or turbine speed. In another example, power may be de-rated responsive to the wall temperature remaining greater than the upper threshold temperature after increasing engine speed.

In another embodiment, additional engine operating parameter adjustments may be made to decrease the wall temperature and/or increase the upper threshold temperature. These additional adjustments may include increasing the coolant flow rate through the EGR cooler, decreasing EGR flow (e.g., decreasing the gas flow rate through the EGR cooler), decreasing exhaust temperature, or the like. In one example, these additional adjustments may only occur when engine speed is at a maximum threshold speed and engine power cannot be de-rated further without affecting engine performance.

In this way, an engine operating parameter may be adjusted responsive to a wall temperature in a heat exchanger being greater than an upper threshold temperature. Alternatively, the engine operating parameter may not be adjusted when the wall temperature is less than the upper threshold temperature. Adjusting an engine operating parameter may include one or more of increasing engine speed and de-rating power. In one example, the heat exchanger may be an EGR cooler wherein heat is transferred between a first heat transfer fluid and a second heat transfer fluid in the EGR cooler. The first heat transfer fluid may include an exhaust gas and the second heat transfer fluid may include an engine coolant.

A method for estimating the wall temperature in the heat exchanger may be based on a temperature difference between the first heat transfer fluid and the second heat transfer fluid in the heat exchanger, and thermal resistances across the heat exchanger. The thermal resistances across the heat exchanger may be based on a first convection coefficient and a second convection coefficient, the first convection coefficient based on a temperature and flow rate of the first heat transfer fluid and the second convection coefficient based on a temperature and flow rate of the second heat transfer fluid. The thermal resistances may further be based on fouling coefficients and a thickness and thermal conductivity of a material separating the first heat transfer fluid and the second heat transfer fluid. Details on the method for estimating the wall temperature in the heat exchanger are presented at FIG. 3.

Figure 2:
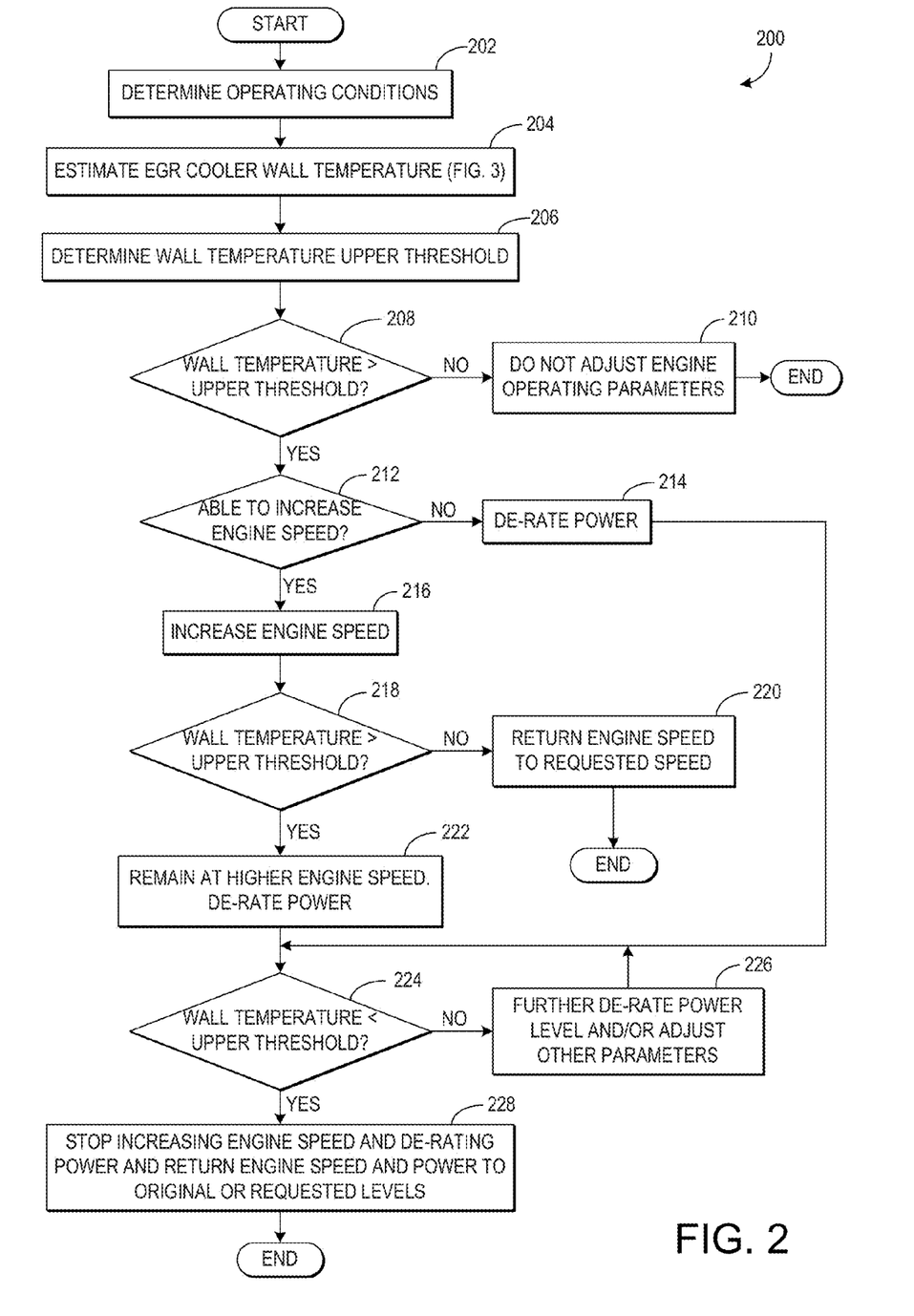
FIG. 2 is a flow chart illustrating a method for adjusting an engine operating parameter based on a wall temperature in a heat exchanger according to an embodiment of the invention.
Figure 3:
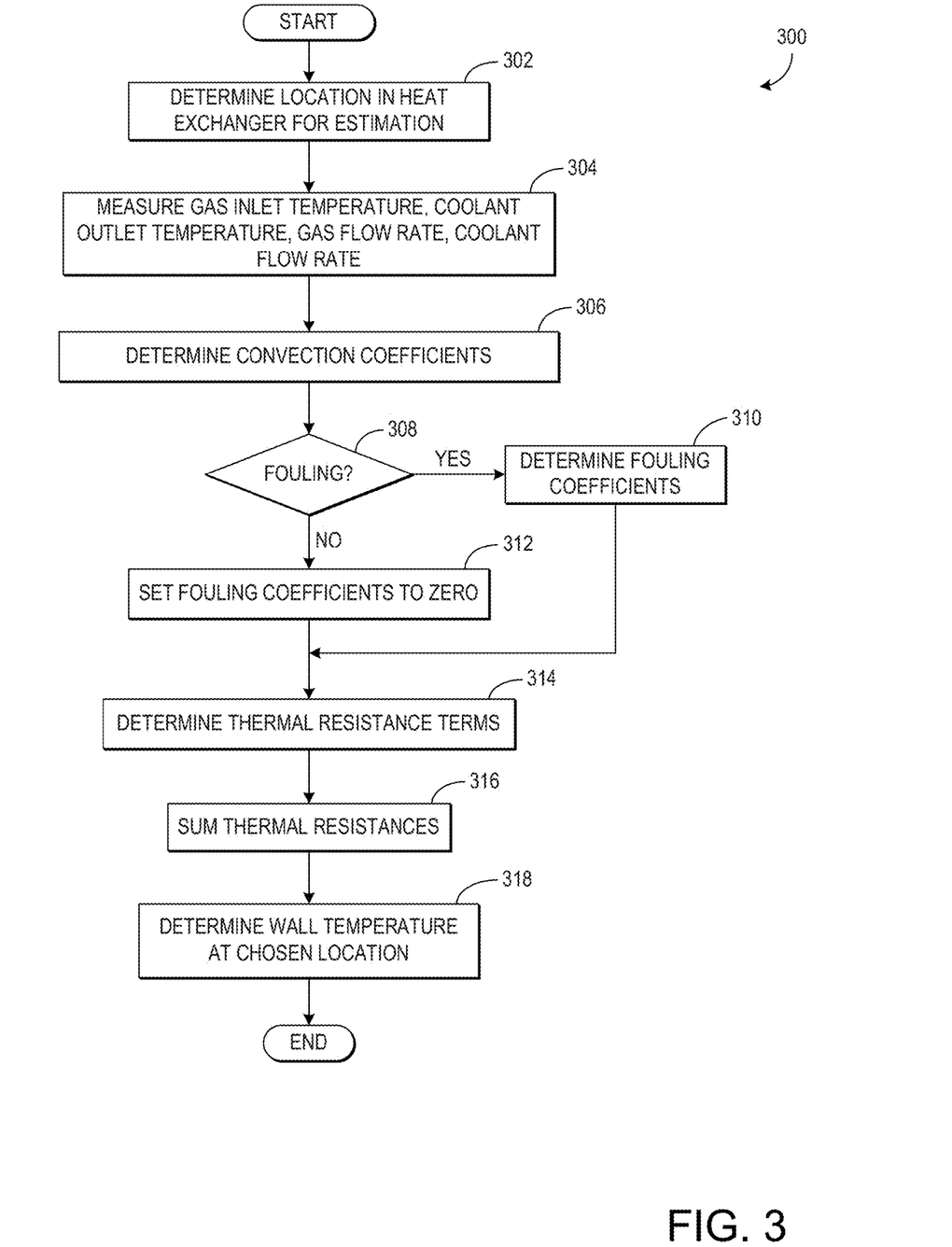
FIG. 3 is a flow chart illustrating a method for estimating a wall temperature in a heat exchanger according to an embodiment of the invention.

Now turning to FIG. 2, an exemplary method is shown for adjusting an engine operating parameter based on a wall temperature in a heat exchanger. Specifically, method 200 adjusts engine speed and engine power in response to the wall temperature in an EGR cooler with respect to an upper threshold temperature. Method 200 may be carried out by an engine control unit, such as controller 110, according to instructions stored thereon. The method begins at 202 by determining engine operating conditions. Engine operating conditions may include engine speed, engine power, temperature and flow rate of engine coolant, temperature and flow rate of EGR, and engine coolant pressure. At 204, the method estimates the EGR cooler wall temperature, based on heat transfer across the EGR cooler. A method for determining the wall temperature is presented at FIG. 3 and described below. After estimating the wall temperature, the method continues on to 206 to determine the wall temperature upper threshold (e.g., upper threshold temperature). The upper threshold temperature may be based on the engine coolant pressure. The engine coolant pressure may be determined either by sensing the pressure directly or estimating the pressure from additional parameters.

At 208, the method determines if the wall temperature is greater than the upper threshold temperature. If the wall temperature is not greater than the upper threshold temperature, the method maintains the current engine operating parameters at 210. As such, the controller does not adjust an engine operating parameter. Specifically, engine speed and engine power rating remain at currently requested levels. However, if the wall temperature is greater than the upper threshold temperature, the method continues on to 212 to determine if engine speed may be increased. The ability to increase engine speed may depend on the current speed level and the maximum threshold speed (e.g., maximum allowable engine speed). For example, if engine speed is already at the maximum threshold speed at 212, it may not be able to be further increased. Thus, if engine speed cannot be increased, the method instead de-rates engine power (e.g., power) at 214. De-rating may include de-rating power by a set power increment. Alternatively, if engine speed may be increased at 212, the method continues on to 216 to increase engine speed. Engine speed may be increased from a first engine speed (e.g., current speed) to a second engine speed, the second engine speed higher than the first engine speed. In one example, the second engine speed or the amount of speed increase may be based on the difference between the wall temperature and the upper threshold temperature. For example, if the difference between the wall temperature and the upper threshold temperature is greater (e.g., greater risk of boiling), the speed increment may be larger. As such, the engine speed may increase to a greater level than if the difference between the wall temperature and the upper threshold temperature were smaller. In another example, the second engine speed may be the maximum threshold speed.

At 218, the method determines if the wall temperature is still greater than the upper threshold temperature. In one example, the method may proceed from 216 to 218 after waiting a duration. As such, the method may wait a set duration after increasing engine speed before checking the wall temperature in relation the upper threshold temperature. If the wall temperature is not greater than the upper threshold temperature at 218, the method returns the engine speed back to the previous or currently requested engine speed at 220. However, if the wall temperature remains greater than the upper threshold temperature, the method instead continues on to 222. At 222, the second engine speed is maintained while the controller de-rates engine power. De-rating power may be performed in increments. For example, power may be de-rated by a set power increment at 222. The set power increment may be based on the difference between the wall temperature and the upper threshold temperature, and further based on an amount of time spent above the upper threshold temperature. In another example, the set power increment may be a pre-determined amount. The method determines if the wall temperature is less than the upper threshold temperature at 224. The method at 224 may include waiting a duration after de-rating power before re-checking the wall temperature. If the wall temperature remains above the upper threshold temperature, the controller may further de-rate power by the set power increment and/or adjust additional parameters at 226 in order to reduce the wall temperature. This may include continuing to operate at the second, higher, engine speed. The controller may first de-rate the engine power at 226 and then loop back to 224 to check the wall temperature with respect to the upper threshold temperature. If the power cannot be further de-rated, for example, if engine power rating reaches a minimum threshold power, additional parameter adjustments may be made at 226. These may include increasing the coolant flow rate through the EGR cooler, decreasing EGR flow, and decreasing exhaust temperature, for example. Method 200 then loops back to 224 to check the wall temperature with respect to the upper threshold temperature again.

When the wall temperature is finally lower than the upper threshold temperature, the method continues on to 228 to stop increasing engine speed and de-rating power. All engine operating parameters that were adjusted, including engine speed and engine power rating, are returned to their previously or currently requested levels. In one example, the method at 228 may include first returning engine power to a currently requested level and then waiting a duration. Then, if the wall temperature is still below the upper threshold temperature, engine speed may be returned to a currently requested level.

In this way, an engine operating parameter may be adjusted responsive to a wall temperature in a heat exchanger (e.g., EGR cooler) being greater than an upper threshold temperature. Engine operating parameter adjustments may act to decrease the wall temperature and/or increase the upper threshold temperature. In this way, boiling events on the coolant side of the heat exchanger may be reduced. The method presented at FIG. 2 includes adjusting engine speed and engine power in response to the wall temperature. In other embodiments, a similar method may be used to vary alternative or additional engine operating parameters that influence the wall temperature and/or the upper threshold temperature. In one example, these alternative engine operating parameters may include EGR flow, coolant flow, and exhaust temperature.

Adjusting engine operating parameters may be responsive to a wall temperature in a heat exchanger. An estimation of the wall temperature may be determined using a method based on a temperature difference between a first heat transfer fluid and a second heat transfer fluid in the heat exchanger and thermal resistances across the heat exchanger. FIG. 3 is a flow chart illustrating such a method 300 for estimating the wall temperature in the heat exchanger.

Estimating a wall temperature includes estimating heat transfer at a location in a heat exchanger. The heat transfer, Q, across a selected location, or segment, in the heat exchanger is defined by:

$$Q = \frac{\Delta T_{tot}}{R_{tot}} = \frac{\Delta T_L}{R_L} \quad (1)$$

where Q is the local heat transfer across the heat exchanger at the selected location, $\Delta T_{tot}$ is the temperature difference across the heat exchanger (e.g., temperature difference between the first fluid and the second fluid in the heat exchanger at the selected location), $R_{tot}$ is the total or sum of thermal resistances across the heat exchanger at the selected location, $\Delta T_L$ is the temperature difference between one of the fluids and the temperature of concern (e.g., wall temperature), and $R_L$ is the thermal resistance between $\Delta T_L$. The temperature difference across the heat exchanger, $\Delta T_{tot}$, is the temperature difference between the first heat transfer fluid and the second heat transfer fluid in the heat exchanger. In one example, the heat exchanger is an EGR cooler and the first heat transfer fluid is the exhaust gas and the second heat transfer fluid is the engine coolant. Thus, $\Delta T_{tot}$ is the difference between the bulk exhaust gas temperature at a certain location in the flow passage (gas inlet, for example), $T_{gas}$, and the bulk engine coolant temperature at a certain location in the flow passage (coolant outlet, for example), $T_{coolant}$. Method 300 includes determining the temperatures across the heat exchanger, the temperatures across the chosen location, and the thermal resistances across the heat exchanger. The method then uses this information, along with additional heat transfer parameters, to determine the heat transfer across the location and finally, the wall temperature.

Method 300 begins at 302 by determining the location in the heat exchanger for estimation. In the example of the EGR cooler, the location may be a selected wall location on the outlet side of the coolant passage in the EGR cooler. Thus, the wall temperature may be estimated at this location in the EGR cooler. As such, local boiling may be predicted at this location. In an alternate embodiment, the location may be another location in the heat exchanger in which temperature estimation is required.

At 304, the method measures and/or estimates using other parameters the inlet gas (e.g., exhaust gas) temperature, the outlet coolant temperature, the gas or EGR flow rate, $W_{gas}$, and the coolant flow rate, $W_{coolant}$. The coolant flow rate $W_{coolant}$ may be based on the engine speed. The coolant flow rate and the gas flow rate may be the flow rate of the coolant and the exhaust gas through the EGR cooler, respectively. The inlet gas temperature and outlet coolant temperature may be used as the bulk gas temperature, $T_{gas}$, and the bulk coolant temperature, $T_{coolant}$, respectively. At 306, the method uses this information to determine the gas convection coefficient, $h_{gas}$, and the coolant convection coefficient, $h_{coolant}$. The gas convection coefficient, $h_{gas}$ may be based on the temperature and flow rate of the gas through the heat exchanger (e.g., $T_{gas}$ and $W_{gas}$). Similarly, the coolant convection coefficient, $h_{coolant}$ may be based on the temperature and flow rate of the coolant through the heat exchanger (e.g., $T_{coolant}$ and $W_{coolant}$). More specifically, each fluid convection coefficient may be estimated by the conductivity of the fluid, the Prandtl number, based on the viscous diffusion rate and thermal diffusion rate of the fluid, the viscosity of the fluid, the flow rate of the fluid, and a predetermined knowledge of the heat exchanger geometry at the location of interest. In one example, the convection coefficients may be mapped to a wide range of temperatures and flows for various engine operating conditions. In this way, a convection coefficient map may be created and stored in the controller. As one example, the controller may look up the convection coefficients in the convection coefficient map at 306, based on the temperature and flow rates of the corresponding heat transfer fluids.

At 308, the method determines if there is fouling in the heat exchanger or EGR cooler. In one example, fouling may include oil or condensate in the gas side of the EGR cooler. If there is fouling, the method at 310 determines a coolant fouling coefficient, $R_{coolant}$, and a gas fouling coefficient, $R_{gas}$. In one example, determining the fouling coefficients may be based on estimated cooler fouling which is a function of engine run time, run time in different modes of engine operation, an estimated amount of fouling material present in the exhaust gas, or the like. Alternatively, the method at 310 may include estimating fouling coefficients and/or setting fouling coefficients to zero to achieve a conservative estimate (e.g., highest possible estimate) for wall temperature. If fouling is not present, the method sets the fouling coefficients to zero at 312.

At 314, the method determines the thermal resistance terms across the heat exchanger. This may include a thermal resistance for convection on the gas side of the EGR cooler, $R_{cvg}$, based on the gas convection coefficient, $h_{gas}$, and the area of the control volume at the chosen location, A. This may also include a thermal resistance for fouling on the gas side of the EGR cooler, $R_{fg}$, based on the gas fouling coefficient, $R_{gas}$, and the area of the control volume at the chosen location, A. Thermal resistances may further include a thermal resistance for conduction, $R_{cond}$, based on a thickness of the material of the heat exchanger separating the exhaust gas and the coolant, L, the thermal conductivity of the material, $k_{he}$, and the area of the control volume at the chosen location, A. There may also be a thermal resistance for fouling on the coolant side of the EGR cooler, $R_{fc}$, based on the coolant fouling coefficient, $R_{coolant}$, and the area of the control volume at the chosen location, A. Finally, there may be a thermal resistance for convection on the coolant side of the EGR cooler, $R_{cvc}$, based on the coolant convection coefficient, $h_{coolant}$, and the area of the control volume at the chosen location, A. These thermal resistances may be defined using the above variables by the following formulas:

$$R_{cvg} = \frac{1}{h_{gas}A} \quad (2)$$

$$R_{fg} = \frac{R_{gas}}{A} \quad (3)$$

$$R_{cond} = \frac{L}{k_{he}A} \quad (4)$$

$$R_{fc} = \frac{R_{coolant}}{A} \quad (5)$$

$$R_{cvc} = \frac{1}{h_{coolant}A} \quad (6)$$

At 316, the thermal resistances determined at 314 may be summed and inserted into equation 1, as described above:

$$Q = \frac{\Delta T_{tot}}{R_{tot}} = \frac{\Delta T_L}{R_L} \quad (1)$$

By rearranging equation 1 and solving for the temperature difference across the location, $\Delta T_L$, the equation becomes:

$$\Delta T_L = \frac{\Delta T_{tot}\left(\frac{1}{h_{coolant}}\right)}{\frac{1}{h_{coolant}} + R_{coolant} + \frac{L}{k_{he}} + R_{gas} + \frac{1}{h_{gas}}} \quad (7)$$

The bulk gas and coolant temperatures, as discussed above, may then be inserted into equation 7, along with substituting $\Delta T_L = T_{wall} - T_{coolant}$:

$$T_{wall} = T_{coolant} + \frac{T_{gas} - T_{coolant}}{1 + h_{coolant}\left(R_{coolant} + \frac{L}{k_{he}} + R_{gas} + \frac{1}{h_{gas}}\right)} \quad (8)$$

At 318, the controller may use equation 8 to determine the wall temperature at the chosen location within the EGR cooler or heat exchanger. In this way, the wall temperature in the EGR cooler may be estimated based on a temperature difference between the first heat transfer fluid (e.g., exhaust gas) and second heat transfer fluid (e.g., engine coolant) in the EGR cooler and thermal resistances across the EGR cooler.

Figure 4:
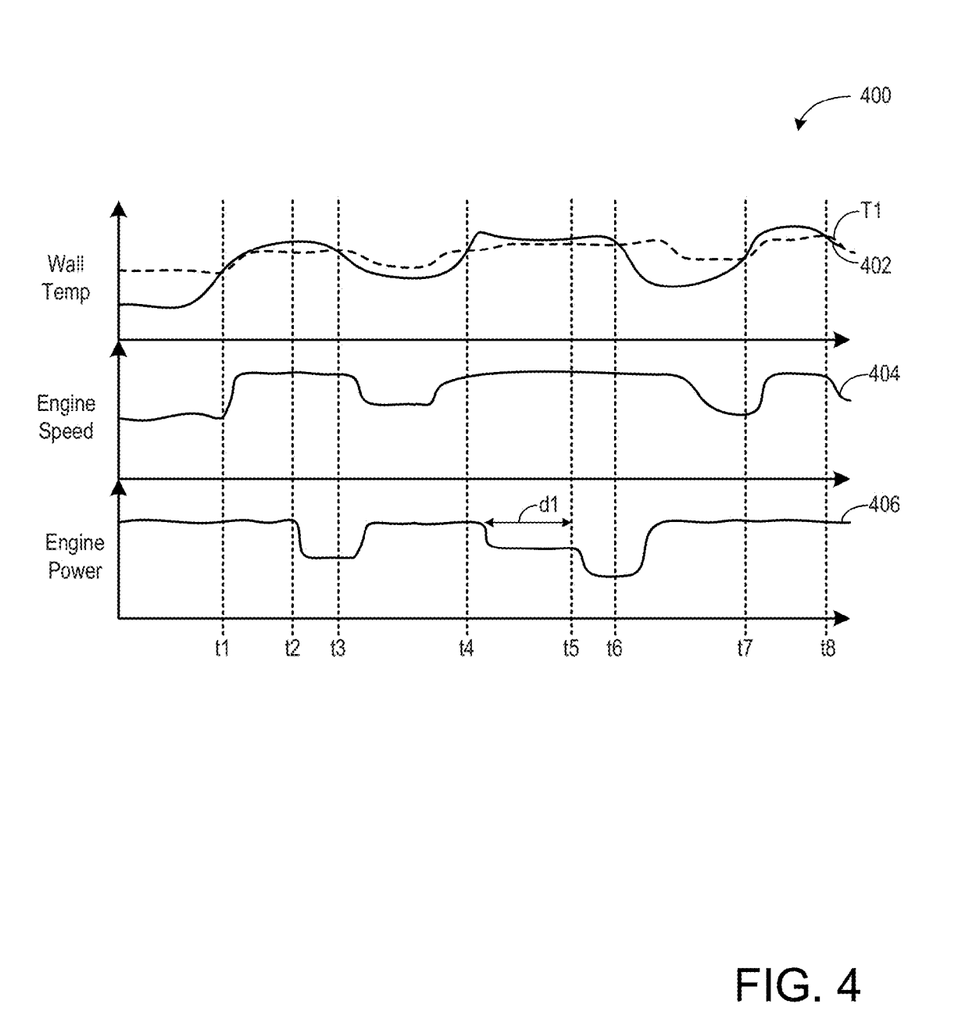
FIG. 4 is a graph showing example engine operating parameter adjustments based on a wall temperature in a heat exchanger according to an embodiment of the invention.

FIG. 4 is a graph 400 showing example engine operating parameter adjustments based on a wall temperature in a heat exchanger. The example illustrated in graph 400 is for the wall temperature in an EGR cooler of an engine system. Specifically, graph 400 shows changes in the wall temperature at plot 402, changes in engine speed at plot 404, and changes in engine power rating (e.g., engine power) at plot 406. Plot 402 also shows changes in the upper threshold temperature, T1. Engine operating parameter adjustments in response to wall temperature may act to decrease wall temperature, increase the upper threshold temperature T1, or both. Though graph 400 shows adjustment to engine speed and engine power, in other embodiments, alternative or additional operating parameters may be adjusted.

Before time t1, the wall temperature may be below the upper threshold temperature T1 (plot 402). Engine speed and engine power may be at relatively constant levels. At time t1, wall temperature increases above the upper threshold temperature T1. In response, the controller may increase engine speed from a first engine speed to a second, higher, engine speed (plot 404). Increasing engine speed causes upper threshold temperature T1 to increase. However, the wall temperature remains above the upper threshold temperature T1. As a result, the controller may de-rate power at time t2 (plot 406) while engine speed remains at the higher level. De-rating the power causes the wall temperature to decrease (plot 402). At time t3, the wall temperature (plot 402) decreases below the upper threshold temperature T1. In response to the wall temperature being less than the upper threshold temperature T1, the engine speed and engine power are returned to currently requested levels.

At time t4, wall temperature increases above the upper threshold temperature T1. Engine speed may be at a maximum threshold speed and, thus, unable to increase at time t4. In response, the controller may de-rate engine power at time t4 by a set increment (plot 406). As a result, the wall temperature may decrease slightly (plot 402). However, after a duration d1, wall temperature may remain greater than upper threshold temperature T1. Thus, at time t5, the controller may further de-rate power by another set increment. The wall temperature may decrease below the upper threshold temperature T1 at time t6. In response to the wall temperature being less than the upper threshold temperature T1, engine power is returned to its original or currently requested level.

At time t7, the wall temperature increases above the upper threshold temperature T1. In response, the controller may increase engine speed. As a result, the upper threshold temperature T1 increases. The wall temperature may decrease below upper threshold temperature T1 at time t8. This may occur in short enough duration such that de-rating power or additional engine operating parameter adjustments are not necessary.

In this way, during a first condition, when the wall temperature in the heat exchanger is greater than the upper threshold temperature, engine speed is increased. This is shown in graph 400 at time t1 and time t7. During a second condition, different from the first condition, power is de-rated. The second condition may include when the wall temperature in the heat exchanger is greater than the upper threshold temperature and the engine speed is at a maximum threshold speed. This is shown in graph 400 at time t2 and time t4. At these times, engine speed may be at a maximum threshold speed such that it cannot be further increased. Thus, the controller de-rates power to decrease the wall temperature below the upper threshold temperature and reduce the chance of boiling in the heat exchanger.

An embodiment relates to a method (e.g., a method for controlling an engine). The method comprises adjusting an engine parameter of an engine coupled to a heat exchanger based on a wall temperature at a location in the heat exchanger. The engine operating parameter is adjusted when the wall temperature is indicative of local boiling in the heat exchanger at the location. The engine operating parameter is adjusted to at least one of reduced the wall temperature below a point indicative of the local boiling and/or eliminate, or at least mitigate (e.g., reduce a duration), local boiling in the heat exchanger at the location.

In this way, a method for estimating a wall temperature in a heat exchanger may provide a prediction for local boiling and reduce the likelihood of bulk boiling in the heat exchanger (since local boiling will occur prior to bulk boiling). A wall temperature may be estimated by estimating the heat transfer at a chosen wall location in the heat exchanger. When the wall temperature is higher than an upper threshold temperature, there may be a risk of local boiling. Thus, in response, a controller may adjust engine operating parameters to reduce the wall temperature and increase the upper threshold temperature. As such, the wall temperature in the heat exchanger may be controlled and boiling in the heat exchanger may be reduced.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
increasing an engine speed of an engine coupled to a heat exchanger based on a wall temperature at a location in the heat exchanger while maintaining motor traction power of a traction motor, the engine speed increased up to a maximum rated speed of the engine, the wall temperature including a temperature of a wall in fluid contact with an engine coolant; and
responsive to the engine speed increasing to the maximum rated speed of the engine, de-rating engine power.

2. The method of claim 1, further comprising increasing the engine speed from a first engine speed to a second engine speed when the wall temperature is greater than an upper threshold temperature, the upper threshold temperature based on an engine coolant pressure.

3. The method of claim 2, wherein the engine coolant pressure is a pressure downstream of a coolant pump and upstream of the heat exchanger.

4. The method of claim 2, wherein the engine coolant pressure is one or more of a sensed or modeled pressure at the location in the heat exchanger.

5. A method, comprising:
adjusting an engine operating parameter of an engine coupled to a heat exchanger based on a wall temperature at a location in the heat exchanger, wherein adjusting the engine operating parameter includes increasing an engine speed of the engine, the wall temperature including a temperature of a wall in fluid contact with an engine coolant;
increasing the engine speed from a first engine speed to a second engine speed when the wall temperature is greater than an upper threshold temperature, the upper threshold temperature based on an engine coolant pressure; and
de-rating engine power of the engine when the wall temperature remains greater than the upper threshold temperature after increasing the engine speed.

6. The method of claim 1, further comprising estimating the wall temperature by estimating heat transfer at the location in the heat exchanger, based on a temperature difference between the engine coolant and a second heat transfer fluid, and further based on one or more thermal resistances across the heat exchanger.

7. The method of claim 6, wherein estimating the heat transfer includes determining a first convection coefficient based on a temperature and flow rate of the engine coolant and a second convection coefficient based on a temperature and flow rate of the second heat transfer fluid.

8. The method of claim 7, wherein estimating the heat transfer further includes determining the one or more thermal resistances across the heat exchanger based on the first convection coefficient, the second convection coefficient, one or more heat exchanger material properties, and one or more fouling coefficients.

9. The method of claim 1, wherein the heat exchanger is an exhaust gas recirculation cooler, wherein the location is a selected location on an outlet side of a coolant passage in the exhaust gas recirculation cooler, and wherein the engine is coupled to an alternator that generates electric power, the electric power driving the traction motor coupled to motive wheels of a rail vehicle.

10. A method, comprising:
sensing bulk boiling of a heat transfer fluid in a heat exchanger via a heat transfer fluid temperature measured by a heat exchanger temperature sensor;
estimating local boiling of the heat transfer fluid via a wall temperature of the heat exchanger; and
adjusting an engine operating parameter including one or more of increasing engine speed or de-rating power of an engine responsive to the wall temperature in the heat exchanger being greater than an upper threshold temperature to reduce wall temperature before bulk boiling occurs, the wall temperature including a temperature of a wall in fluid contact with the heat transfer fluid.

11. The method of claim 10, further comprising not adjusting the engine operating parameter when the wall temperature is less than the upper threshold temperature.

12. The method of claim 10, wherein the heat exchanger is an exhaust gas recirculation cooler, wherein heat is transferred between the heat transfer fluid and a second heat transfer fluid in the exhaust gas recirculation cooler, the second heat transfer fluid including an exhaust gas and the heat transfer fluid including an engine coolant.

13. The method of claim 10, further comprising estimating the wall temperature in the heat exchanger based on a temperature difference between the heat transfer fluid and a second heat transfer fluid in the heat exchanger and one or more thermal resistances across the heat exchanger.

14. The method of claim 13, further comprising determining the one or more thermal resistances across the heat exchanger based on a first convection coefficient and a second convection coefficient, the first convection coefficient based on a temperature and flow rate of the heat transfer fluid and the second convection coefficient based on a temperature and flow rate of the second heat transfer fluid.

15. The method of claim 14, wherein determining the one or more thermal resistances is further based on fouling coefficients and a thickness and thermal conductivity of a material separating the heat transfer fluid and the second heat transfer fluid, wherein the fouling coefficients are determined based on estimated cooler fouling, the estimated cooler fouling based on one or more of an engine run time, a run time in different modes of engine operation, and an estimated amount of fouling material present in an exhaust gas.

16. The method of claim 10, wherein the upper threshold temperature increases with increasing engine coolant pressure.

17. A method, comprising:
    estimating a wall temperature in a heat exchanger based on a temperature difference between a first heat transfer fluid and a second heat transfer fluid in the heat exchanger and further based on one or more thermal resistances across the heat exchanger, the wall temperature including a temperature of a wall in fluid contact with the first heat transfer fluid and in fluid contact with the second heat transfer fluid;
    during a first condition, when the wall temperature is greater than an upper threshold temperature, increasing engine speed of an engine; and
    during a second condition, different from the first condition, de-rating power of the engine.

18. The method of claim 17, wherein the second condition includes when the wall temperature in the heat exchanger is greater than the upper threshold temperature and the engine speed is at a maximum threshold speed.

* * * * *